(12) United States Patent
Charbon et al.

(10) Patent No.: US 8,983,261 B2
(45) Date of Patent: Mar. 17, 2015

(54) PLASMONIC WAVEGUIDES, CIRCUITS, AND SYSTEMS

(75) Inventors: Edoardo Charbon, The Hague (NL); Mohammad Azim Karami, Delft (NL)

(73) Assignee: Technische Universiteit Delft, Delft (NL)

( * ) Notice: Subject to any disclaimer, the term of this patent is extended or adjusted under 35 U.S.C. 154(b) by 239 days.

(21) Appl. No.: 13/636,933

(22) PCT Filed: Mar. 23, 2011

(86) PCT No.: PCT/NL2011/050201
§ 371 (c)(1),
(2), (4) Date: Nov. 13, 2012

(87) PCT Pub. No.: WO2011/119030
PCT Pub. Date: Sep. 29, 2011

(65) Prior Publication Data
US 2013/0051748 A1    Feb. 28, 2013

(30) Foreign Application Priority Data
Mar. 25, 2010   (EP) .................................... 10157793

(51) Int. Cl.
*G02B 6/10*       (2006.01)
*G02B 6/122*      (2006.01)
(Continued)

(52) U.S. Cl.
CPC .............. *G02B 6/1226* (2013.01); *G02B 5/008* (2013.01); *B82Y 20/00* (2013.01)
USPC .......................................... 385/131; 385/129

(58) Field of Classification Search
CPC ............................... G02B 6/1226; G02B 5/008
See application file for complete search history.

(56) References Cited

U.S. PATENT DOCUMENTS

| 7,583,882 | B2 * | 9/2009 | Guo .............................. 385/131 |
| 7,920,268 | B2 * | 4/2011 | Song ............................. 356/445 |
| 7,949,210 | B2 * | 5/2011 | Durfee et al. ..................... 385/1 |

(Continued)

FOREIGN PATENT DOCUMENTS

| EP | 1 445 632 A1 | 8/2004 |
| WO | 2010/004859 A1 | 1/2010 |

OTHER PUBLICATIONS

G. Veronis et al.: "Modes of Subwavelength Plasmonic Slot Waveguides", Journal of Lightwave Technology, vol. 25, No. 9, Sep. 1, 2007-Sep. 30, 2007, pp. 2511-2521. XP002598208, p. 2512, p. 2514, p. 2519.

(Continued)

*Primary Examiner* — Rhonda Peace
(74) *Attorney, Agent, or Firm* — Young & Thompson

(57) ABSTRACT

Waveguide structure for propagating a surface plasmon polariton, including an inter-metal plasmonic waveguide (1). The waveguide structure has two metal strip like structures (2, 3) positioned parallel to each other and an isolating material structure (4) positioned between the two metal strip like structures (2, 3). The two metal strip like structures (2, 3) are positioned at a fixed distance (d) from each other. The inter-metal plasmonic waveguide (1) is provided in a single layer of a CMOS processed substrate (5). Several waveguide structures (1) may be combined with a crystal like structure (6) to build logic gates, such as a switch having a gate, source and drain terminal (1G, 1S, 1D). Using three dimensional designs spanning several layers in a CMOS processed substrate (5) very complex yet compact logic circuits may be designed.

24 Claims, 4 Drawing Sheets

(51) Int. Cl.
*B82Y 20/00* (2011.01)
*G02B 5/00* (2006.01)

(56) References Cited

U.S. PATENT DOCUMENTS

| | | | |
|---|---|---|---|
| 8,368,990 B2 * | 2/2013 | Ahn | 359/243 |
| 8,681,411 B2 * | 3/2014 | Ahn | 359/243 |
| 2007/0292076 A1 | 12/2007 | Hyde et al. | |
| 2008/0080824 A1 * | 4/2008 | Park et al. | 385/127 |
| 2008/0193078 A1 | 8/2008 | Hyde et al. | |
| 2009/0226132 A1 | 9/2009 | Hyde et al. | |
| 2011/0103742 A1 | 5/2011 | Obara et al. | |
| 2013/0051748 A1 * | 2/2013 | Charbon et al. | 385/131 |

OTHER PUBLICATIONS

Hong-Son Chu et al.: "Tunable propagation of light through a coupled-bent dielectric-loaded plasmonic waveguides", Journal of Applied Physics, vol. 1. 106, 106101, Nov. 16, 2009, XP002598209, p. 106101-1.

Liu Liu et al. : "Novel surface plasmon waveguide for high integration", Optics Express, vol. 13, No. 17, Aug. 22, 2005, pp. 6645-6650, XP002598210, p. 6646.

S. Sederberg et al. : "Monoithic integration of plasmonic waveguides into a complimentary metal-oxide-semiconductor- and photonic-compatible platform", Applied Physics Letters, vol. 96, 121101, Mar. 22, 2010, XP002598211, abstract.

U. Vishkin et al.: "Plasmonics and the parallel programming problem", Proceedings of the SPIE, vol. 6477, Feb. 8, 2007, pp. 64770M-1-64770M-10, XP002598212, p. 6.

Rashid Zia et al.: "Geometries and materials for subwavelength surface plasmon modes", J. Opt. Soc. Am. A/vol. 21, No. 12/Dec. 2004, pp. 2442-2446.

International Search Report, dated Apr. 28, 2011, from corresponding PCT application.

* cited by examiner

PLASMONIC WAVEGUIDES, CIRCUITS, AND SYSTEMS

FIELD OF THE INVENTION

The present invention relates to a waveguide structure for propagating a surface plasmon polariton.

PRIOR ART

The article 'Modes of Subwavelength Plasmonic Slot Waveguides', Journal of Lightwave technology, vol. 25, no. 9, 1 Sep. 2007 by G. Veronis and S. Fan discloses plasmonic waveguides. This plasmonic waveguide disclosed has a planar metal-insulator-metal structure (see FIG. 1d), and specifically mentions a waveguide having a silver-silica-silver waveguide slot. No information is taught to the skilled person on the use of other materials than silver and silica. Furthermore, waveguides are disclosed where the surrounding dielectric material above and below the metal film are different. Here the authors mention that the metal film is provided with an air slot. Under paragraph VII, an MDM structure is discussed in which the strip width is much smaller than the wavelength of light (see also FIG. 11).

The article 'Novel surface Plasmon waveguide for high integration' by Liu Liu et al., Optics Express vol. 13, no. 7, 22 Aug. 2005, discloses a surface plasmon waveguide, which is formed by etching a trench in a metal (silver) layer on an insulating dielectric (silica), and coating the structure with a polymer. The article discusses the necessity to match the refractive index of the cladding layer (PMMA) to that of the base material (silica)

American patent publication US2009/0142016 discloses plasmonic optics for plasmonic circuits using dielectric layers of different dielectric permittivity adjacent to a metal layer.

The article by R. Zia et al. 'Geometries and materials for subwavelength surface plasmon modes', Journal Optical Society of America, Vol. 21, N. 12, pp 2242-2246, Dec. 2004 discloses the application of surface plasmon polariton in Metal-Insulator-Metal structures. In these structures, a surface plasmon polariton is confined in a dielectric layer between two metal layers. Manufacturing such structures requires many processing steps to obtain the at least three layers.

SUMMARY OF THE INVENTION

According to the present invention, a waveguide structure is provided comprising a plasmonic waveguide having two strip like structures of a first material positioned parallel to each other and a further strip like structure of a second material positioned between the two strip like structures of the first material, the first and second material being different materials selected from the group of a metal material and an isolating material, the two strip like structures of the first material being positioned at a fixed distance from each other, wherein the plasmonic waveguide is provided in a single layer of a CMOS processed substrate. This is different from known metal-insulator-metal or insulator-metal-insulator surface plasmon polariton waveguides where layers are formed subsequently on top of each other. The present waveguide embodiments can be efficiently synthesized on different (e.g. metal) layers in CMOS, and provide sufficient propagation to allow building of more complex plasmonic structures.

In a further embodiment, the first and second material of the waveguide structure comprises CMOS compatible materials. E.g., the first material comprises Al or Cu material, which provide sufficient propagation properties on the relevant waveguide scale. Al and Cu are widely used in known CMOS processing techniques for providing metallization layers in integrated circuits The second material comprises e.g. $SiO_2$ which is widely used in CMOS processing techniques, as known to the person skilled in the art. A CMOS processed substrate is a substrate (usually of a semiconductor material such as Si) on which layers can be deposited using techniques known as such, or in which regions of the top layer of the substrate can be processed to obtain different properties. Layers can comprise oxide materials (e.g. by oxidizing Si of the top layer of the substrate and metal materials, such as Al or Cu. The layers can also be patterned layers, using e.g. resist techniques, known to the skilled person as such.

In this application, the term CMOS processed substrate relates to a substrate which is modified using processing steps which are known from the well known and widely utilized CMOS processing field. These processing steps are depositing (patterned) layers of a dielectric material, such as $SiO_2$, on a substrate surface, depositing (patterned) layers of a conductive material, such as Cu or Al on a substrate surface, or modifying a top layer of the substrate (e.g. oxidizing Si).

The fixed distance has a value within the range from 50-450 nm in a further embodiment, allowing efficient surface plasmon polariton propagation at a wide range of wavelengths. In further embodiments, the width of the two strip like structures of the first material is between 80 and 300 nm, e.g. 120 nm. This width range is compatible with CMOS processing techniques for providing wire-like structures in a substrate layer.

In a further embodiment, the thickness (or height) of the two strip like structures of the first material is in the order of magnitude of a single layer of metallization as applied in CMOS processing, i.e. few tens to a few hundreds of nanometers. This thickness is fully compliant with the propagation of surface plasmon polaritons in the present waveguide structure embodiments.

The waveguide structure comprises two plasmonic waveguides in a further embodiment which extend in two different directions (e.g. at 90°) in the single layer, and at least one sectional plasmonic waveguide connecting the two plasmonic waveguides. This allows to form a bend or a rotating waveguide structure. The bend may be formed using one sectional waveguide, or multiple sectional waveguides, forming a (semi-)continuous bend.

In further embodiments, the waveguide structure comprises a crystal-like part, the crystal-like part comprising one or more interruptions in one or both of the two strip-like structures of the first material. The dimensions of the interruptions are comparable to the width of the metal strip.

In a specific embodiment, the waveguide structure comprises three plasmonic waveguides connected to each other by the crystal-like part. The crystal like part provides the capability to build more complex structures, e.g. a switch with a gate, source and drain terminal, where surface plasmon polaritons can interact to provide the desired functionality.

In further embodiments of the present invention, a further plasmonic waveguide is provided, the further plasmonic waveguide being oriented plan parallel to the single layer or perpendicular to the single layer. This allows to build three dimensional structures in a stacked geometry. As an example an. interconnect of two crossing waveguides is possible, but also more complex orientations of the different terminals in a switch.

Similar to other types of waveguides, the waveguide structure may in a further embodiment comprise a termination element. The termination element may be implemented as a scattering structure for converting surface plasmon polaritons to photons or vice-versa. The scattering structure may be implemented in the form of a plurality of quantum dots. This allows to couple photons in our out of the waveguide structure, i.e. a transformation of photons into surface plasmon polaritons, and vice-versa. In one embodiment, the first material is a metal, and the termination element is a metal structure short-circuiting the two metal strip-like structures, thereby forming a closed termination. Again, this type of structure may be used as a scattering structure for converting surface plasmon polaritons to photons.

In a further embodiment, the second material is an isolating material, and the termination element is formed by a border of the isolating material between the two metal strip-like structures, which is an equivalent of an open end termination in a waveguide. Again, this termination element may be formed as a scattering structure to transform a surface plasmon polariton into photons.

A photon detector is provided in a further embodiment overlying the termination element for conversion into an electrical signal. The photon detector can then detect the photon originating from a surface plasmon polariton in the waveguide structure. The photon detector may be one of the group of SPAD, PiN, PN, APD, MSM, which are photon detectors known as such in this technical field. Any one of the proposed photon detectors may be used without limitation.

It is noted that the waveguide structures according to the present invention embodiments are also suitable for direct electron to plasmon conversion, when using a suitable interface element for converting electrons to surface Plasmon polaritons and vice versa. E.g. it is possible to generate terahertz surface plasmon polaritons on a metal wire by launching electron bunches onto a tapered end of the wire.

In a further aspect, the present invention relates to a plasmonic integrated circuit comprising one or more waveguide structures according to any one of embodiments described above. By properly combining waveguide structures into logic gates, complex logic circuits may be designed. Especially when using the embodiments in a three dimensional manner, very high density of a logic circuit may be obtained.

Furthermore, the present invention relates to a method for providing a waveguide structure as defined in claim 15.

SHORT DESCRIPTION OF DRAWINGS

The present invention will be discussed in more detail below, using a number of exemplary embodiments, with reference to the attached drawings, in which FIG. 1 shows a perspective view of a waveguide structure according to an embodiment of the present invention;

DETAILED DESCRIPTION OF EXEMPLARY EMBODIMENTS

Figure 1:
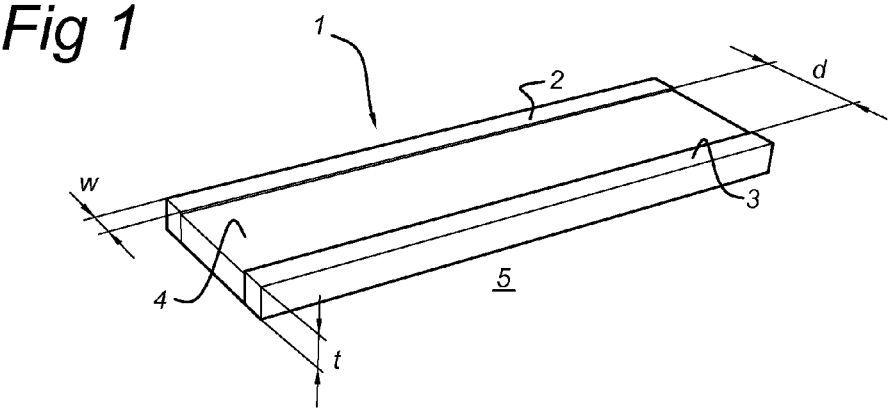

Miniaturization is a continuous trend in the electronic industry. This trend, with the steady doubling of transistor density every 18 months, known as Moore's Law, has been enabled by advances in integrated circuit and in silicon process technology. However, with transistor lengths approaching a few tens of atoms and the emergence of quantum mechanical effects, it has become urgent to find alternatives to a purely electrical approach to design.

A plasmonic approach to data and information processing is proposed. A plasmonic integrated circuit is a logic circuit where electrical logic levels are replaced with optical levels and active gates by plasmonic-based logic gates (PLG). A PLG is a gate capable of manipulating packets of "1" and "0" represented by surface plasmon polaritons (SPPs). SPPs are regenerated at each logic operation by means of an appropriate optical mechanism and thus binary information propagates over relatively large distances horizontally and vertically (through stacks of metal layers) at nearly the speed of light. At the integrated circuit I/O boundary, logic information in photonic form is converted to and from SPPs by specific structures via scattering, quantum dots, and other techniques. All logic operations, conversions, and storage may be performed with devices that are based on metal conductors fully compatible with conventional deep-submicron CMOS processes.

A mixed electrical/photonic approach to information transport and processing is used in certain invention embodiments, whose advantages are multifold. The embodiments proposed are compatible with conventional CMOS processes, leveraging the most advanced deep-submicron technologies available. Moreover, thanks to the reliance on light for information transport, it will be possible to drastically reduce requirements on energy per unit processing. This will extend current system complexity limitations due to heat removal by several orders of magnitude. Lastly, thanks to the introduction of ultra compact plasmonics-based logic gates, electrical interference will be drastically reduced and current speed limitations will be extended.

The key technological breakthrough will be the creation of gates capable of manipulating femtosecond light pulses in time and space domain, simultaneously. The building blocks of the new logic style will be conventional metal layers forming waveguide structures 1 according to the present invention embodiments. If properly arranged, these waveguide structures 1 will enable dense stacking of gates and information transfer lines, thus achieving true 3D integration, while extremely high densities of computing elements will be possible thanks to currently available multi-metal-layer CMOS processes.

A plasmonic integrated circuit (IC) is a logic circuit where active gates are replaced by plasmonics-based logic gates (PLGs). A PLG is a photonic gate capable of manipulating femtosecond light pulses in packets of "1" and "0" binary information. In a PLG, binary information packets are switched, absorbed, or transmitted by means of metallic structures supporting surface plasmon polaritons (SPP). Since these plasmon polaritons are the quantization of classical plasma oscillations, most of their properties are derived from and are consistent with Maxwell's equations. They can therefore be modeled using well-known computational methods.

Surface plasmon polaritons generally require specific metal structures of a few tens of nanometers in size. Under these constraints, it has been shown that thin metal films of finite width can be used to propagating electromagnetic energy over several millimeters, but with limited efficiency. More recently however, many researchers have shown that the propagation of plasmonic waves in ultra-thin metal-insulator-metal structures could be highly efficient for distances up to several hundreds of microns.

The approach proposed in this description of invention embodiments is based on a novel family of geometries, capable of supporting surface plasmon polaritons that is fully compatible with standard deep submicron CMOS processes. This novel approach relies on the fact that in CMOS fabrication the spacing between different layers is controlled with a high level of accuracy. Thus, one can build precise channels where the free electron gas is confined with much more relaxed constraints on the thickness and smoothness of the metal layer. In addition, this approach relaxes the requirement on using noble metals and allows aluminum and copper to be integrated in plasmonic ICs.

Surface plasmon polaritons in general exist at the interface between positive (isolation) and negative dielectric (metal) zones. In most CMOS technologies, the metal composition is fixed (aluminum or copper). However, by proper selection of metal layers and appropriate structural layout design, propagation length and coupling efficiency can be controlled well. With most CMOS technologies entering sub-100 nm feature-size regime, today's design rules can in general support the design of waveguide structures 1 which allow propagation of surface plasmon polaritons and thus plasmonic logic gates (PLG). The proposed waveguide structure 1 utilizes the concept of inter-metal plasmonic waveguide, in which both vertical and horizontal arrangements of complex plasmonic logic gates are possible.

In FIG. 1, a waveguide structure 1 according to an embodiment is shown in a perspective view. The waveguide structure 1 comprises an inter-metal plasmonic waveguide 1 having two metal strip like structures 2, 3 positioned parallel to each other and an isolating (e.g. also dielectric) material structure 4 positioned between the two metal strip like structures 2, 3. The first and second metal strip like structures 2, 3 are positioned at a fixed distance d from each other, and each have a width w and thickness t (corresponding to the thickness or height of the entire waveguide structure 1). The inter-metal plasmonic waveguide is provided in a single layer of a CMOS processed substrate 5. A Surface plasmonic polariton (SPP) can effectively propagate (at nearly the speed of light) in the longitudinal direction of the waveguide structure 1.

It is noted, that an alternative structure may be formed, in which an insulator-metal-insulator (IMI) waveguide structure 1 is used. In this case, the waveguide structure 1 comprising two strip like structures of a first material 2, 3 (the first material in this case being an isolating material) positioned parallel to each other and a further strip like structure of a second material 4 (the second material being a metal material) positioned between the two strip like structures of the first material 2, 3, the two strip like structures of the first material 2, 3 being positioned at a fixed distance d from each other, wherein the plasmonic waveguide 1 is provided in a single layer of a CMOS processed substrate 5.

In the following exemplary embodiments, the MIM structure 1 as described above is taken as example. It will be clear that it is also possible to provide these embodiments using an IMI structure, or even structures having multiple interfaces between metal and isolating material strips in a single layer on a substrate 5. The materials used to manufacture the waveguide structure 1 comprises CMOS compatible materials. E.g., the two metal strip like structures 2, 3 comprise Al or Cu, and the isolating material structure 4 e.g. comprises $SiO_2$. Although better propagation characteristics might be obtained when using other materials (e.g. Au) the material as indicated are fully compatible with CMOS manufacturing techniques, which allows to manufacture complex structures using waveguide structures 1 in a very cost-efficient manner.

In the waveguide structures 1 according to the present invention embodiments, surface plasmonic polaritons can propagate having a specific effective wavelength. For this, the structures 2, 3, 4 have dimensions within predefined ranges. E.g., the fixed distance d between the first and second metal strip like structures 2, 3 (or the width of the isolating material structure 4) has a value within the range from 50-450 nm in a further embodiment. The width w of the two metal strip like structures 1, 2 is e.g. 120 nm. The thickness t of the waveguide structure 1 is in the order of magnitude of a single layer of metallization as applied in CMOS processing, e.g. about 140 nm.

Figure 2:
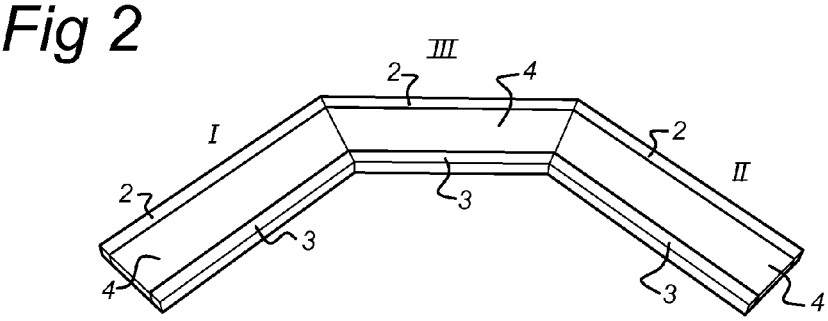
FIG. 2 shows a top view of a further embodiment of the waveguide structure.

In two-dimensional embodiments of the present invention waveguide structures 1, more complex structures may be achieved, e.g. a bend over 90° as illustrated in the top view of the embodiment as shown in FIG. 2. In this embodiment, the waveguide structure comprises two inter-metal plasmonic waveguide sections 1 (indicated by roman numerals I and II in FIG. 2) which extend in two different directions in the single layer, e.g. at 90° with respect to each other as shown. At least one sectional inter-metal plasmonic waveguide 1 is provided (indicated by roman numeral III in FIG. 2) which connects the two inter-metal plasmonic waveguides 1. It has been shown that SPP's can indeed propagate in this complex waveguide structure. In further embodiments, the waveguide structure 1 comprises a (large) number of sectional waveguides III, at incremental angles, thereby forming a semi-continuous bend from waveguide I to waveguide II, or a rotating waveguide. The advantage is, that such structures (longer waveguides, or semi-continuous sectional waveguides) can be made using existing CMOS manufacturing techniques. The (semi-continuous) circular bending embodiment of the waveguide is more efficient.

Besides propagating an optical signal one needs to create more complex waveguide structures 1 capable of switching, reflecting, and/or absorbing such signal in a controlled fashion by other optical signals. In the present invention embodiments, plasmonics-based cross-waveguide planar and stacked geometries may be used that will also ensure switching reversibly. The proposed device is a periodic structure in two or three dimensions, and has similar behavior to a 4-port photonic crystal. The switches can be used as multiplexers, as multipath filters, or as a basis for a logic family. From a basic logic gate, multiple switches may be configured in various ways to achieve the desired logic functions, such as NAND, OR, XOR, etc.

The building blocks of the new logic family will be based on a similar concept, whereas electric currents will be replaced by photon fluxes and power supply by a distributed source S. Plasmonic power S will be distributed throughout a chip by plasmonic waveguide structures 1 or by a global ultra-low-power optical source overhead.

Figure 3A:
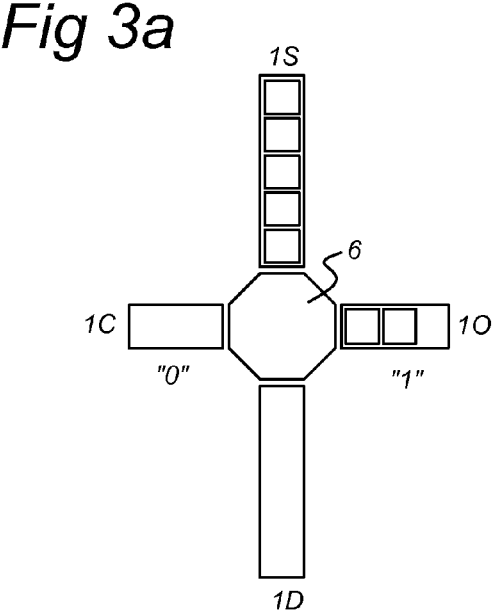
FIGS. 3a and 3b show a top view of a four-port waveguide structure according to a further embodiment implementing an inverter gate.
Figure 3B:
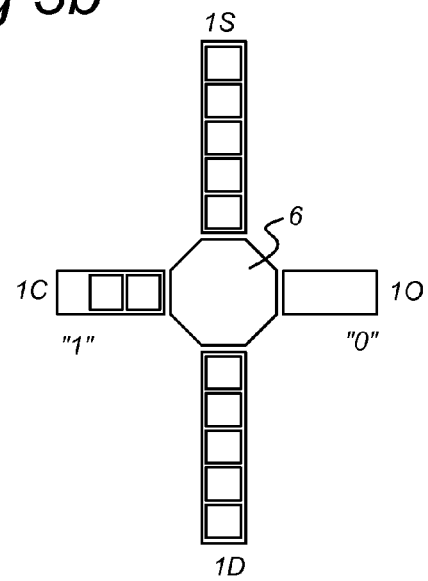

In FIGS. 3a and 3b the a schematic view is shown of an inverter gate (or switch structure) using plasmonic waveguide structures 1 in a switch configuration according to the present invention embodiments. Information packet propagation is represented in terms of EM wave propagation. Controllability will be achieved by optically modulating the surface electron plasma, thus modifying optical propagation efficiency. Electrical control will also be possible, if needed, by direct electron plasma modulation. A photonic crystal-like structure 6 implementing the switch is represented in FIGS. 3*a* and 3*b* by an octagon that hides, of course, the internal complexities of the actual implementation. The switch has a source waveguide 1S, while a control waveguide 1C forces the EM wave from the source waveguide 1S to either a drain waveguide 1D or an output waveguide 1O. In an all-metallic modified cross-waveguide geometry one can reversibly switch on or off by the control input 1C. The design is based on the plasmonic structures 1 having cross-waveguide geometries.

Figure 4:
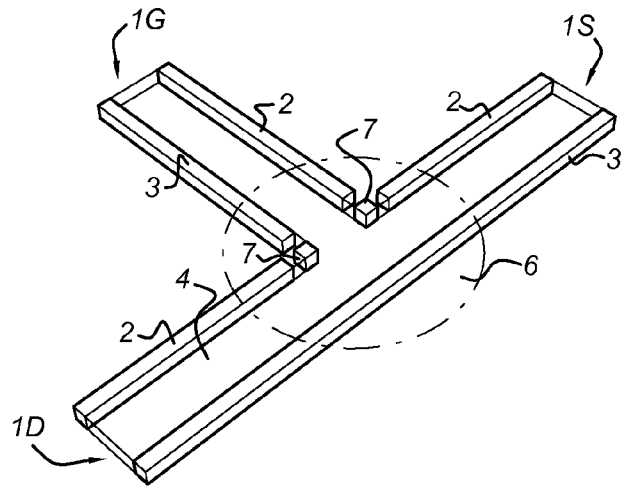
FIG. 4 shows a perspective view of an embodiment of a complex waveguide structure implementing a switch.

In further embodiments of the present invention, a number of the inter-metal plasmonic waveguides 1 may be combined to obtain plasmonic logic gates (PLG), e.g. the one shown in the perspective view of FIG. 4. In general, the waveguide structure 1 then comprises a crystal-like part 6, the crystal-like part 6 comprising one or more interruptions and metal pin-like structures 7 in one or both of the two metal strip-like structures 2, 3. The dimensions of the pin-like structures 7 and the interruptions are dependent on the wavelength of surface plasmonic polaritons which are intended to propagate in the waveguide structures 1, and in general the dimensions are comparable to the distance d between the first and second metal strip like structures 2, 3 (or the width of the isolating material structure 4).

In one embodiment, a switch may be provided using three waveguide structures 1 and a crystal like structure 6, connected to each other as shown schematically in the perspective view of FIG. 4. This three port device may be described in a similar manner as any regular three port device, having a source terminal (upper waveguide structure 1S), a drain terminal (lower waveguide structure 1D) and a controlling or gate terminal (horizontal waveguide structure 1G). The three waveguides 1S, 1D and 1G are connected to each other using the photonic crystal like structure 6: The second metal strip like structure 3 of the source and drain waveguide structures 1S, 1D is continuous and uninterrupted. In the first metal strip like structure 2 of these waveguides 1, a number of interruptions are present, as indicated by a number of metal parts or pin-like structures 7. These metal parts 7 are aligned with the first metal strip like structure 2 of both the source and drain terminals 1S, 1D, and with both metal strip like structures 2, 3 of the gate terminal 1G.

In further embodiments, even more complex structures are possible using a combination of waveguide structures 1, wherein a further inter-metal plasmonic waveguide is provided, the further plasmonic waveguide being oriented plan parallel to the single layer or perpendicular to the single layer. This offers possibilities to design complex three dimensional structures allowing very compact designs of logic circuitry. As propagation of surface plasmon polaritons is very efficient and involves very little dissipation, these complex three dimensional structures can be build without problems relating to heat generation and cooling. These types of structures 1 will enable a great variety of switching and modulation capabilities, as well as electrical/optical controllability and optical/electrical conversion. PLGs will not entirely match conventional logic gates and it will therefore be possible to create compact but relatively complex structures that will implement advanced functionalities. PLGs will be highly miniaturized and will dissipate virtually no power, while requiring minimal infrastructure (no power grid, no anti-latch-up contacts, no wells, etc.). Information transfer will be possible, even at large distances (millimeters) with no or minimal requirement for repeaters, thus further maximizing the overall power efficiency.

Further, both vertical and planar PLGs will be available. As an example, two crossing waveguide structures 1 in different layers, may be interconnected using a connecting structure perpendicular to the layers.

Figure 5:
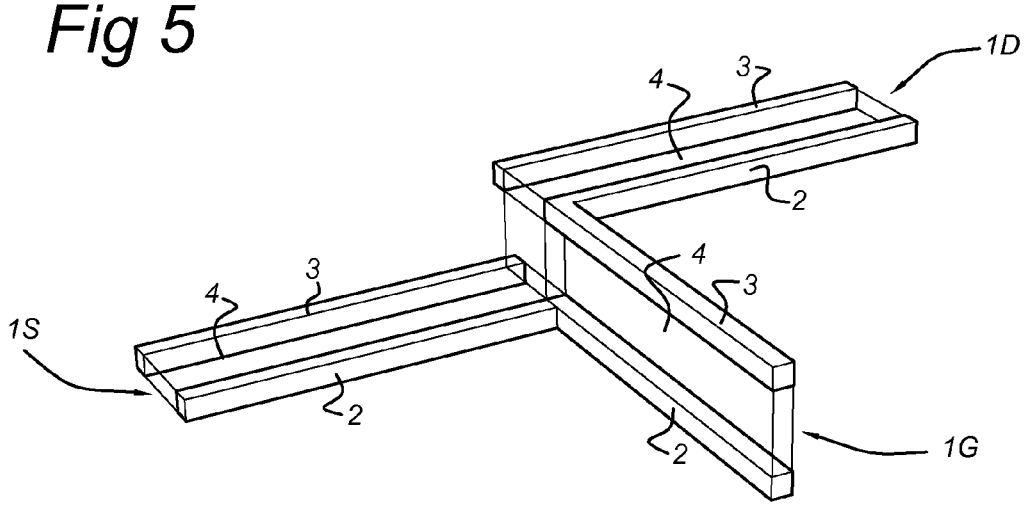
FIG. 5 shows an alternative embodiment of the switch of FIG. 4.

In FIG. 5 an embodiment is shown of a switch as a plasmonic logic gate, in which a gate terminal 1G is made in a vertical direction, while the source terminal 1S and drain terminal 1D are made in two different layers of a CMOS processed substrate. The gate terminal 1G still comprises a first metal strip-like structure 2 in a first layer, however, the isolating material structure 4 is formed in a second layer and the second metal strip like structure 3 in a third layer. The structures 2-4 of the source terminal 1S are positioned in the first layer, while the structures 2-4 of the drain terminal 1D are positioned in the third layer. As shown in FIG. 4, the second metal structure 3 of the source terminal 1S and the second metal structure 3 of the drain terminal 1D are separated by isolating material in the second layer.

The realization of memory devices using waveguide structures 1 according to the present invention embodiments is feasible by considering a looped plasmonic waveguide being recharged by another surface plasmon polariton source.

In further embodiments of the present invention, additional structural elements are added to a waveguide structure 1. These additional structural elements may be used for coupling energy in and out of the waveguide structure 1, e.g. by coupling photon(s) to SPP's and vice versa.

Any chip having plasmonic logic gates as described above will still need to communicate with the outside world. Inbound communication may be achieved by optical means via direct 45-, 90-, or 180-degree fiber coupling. It will also be possible to interface electrically by means of hybrid approaches, for example, by grafting GaN and other materials on silicon. One method of plasmon polariton excitation is using a launch pad. To implement this method the Kretschmann geometry may be used, implementing a $SiO_2$ prism on the top of the metal layer (i.e. strip-like structure 2, 3). The purpose of the microprism or microlens is that of matching the k vector of light for launching as a surface plasmon polariton (SPP) on top of the metal. The prism will also decrease the intensity of reflected wave from the metal.

An alternative technique is based on grating coupling geometries. These structures are based on using Bloch's theory applied to periodic dielectric constant for coupling waves for which the k-vectors ($k_e$ and $k_{sp}$) differ by a reciprocal lattice vector. Optical/electrical conversion may be achieved in further embodiments using ultra-fast single-photon detectors implemented in CMOS.

Figure 6:
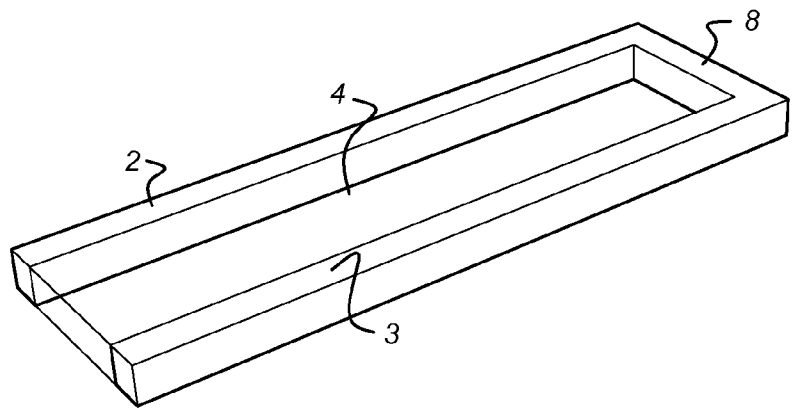
FIG. 6 shows an embodiment implementing a termination of a waveguide structure.

In a first group of embodiments, the waveguide structure comprises a termination element. In FIG. 6, a first embodiment is shown, wherein the termination element is a metal structure 8 short-circuiting the two metal strip-like structures 2, 3. This type of termination element 8 is equivalent to an electrical short circuit in a electromagnetic waveguide. The termination element 8 may act as a scattering element for converting SPP's to photons.

Figure 7:
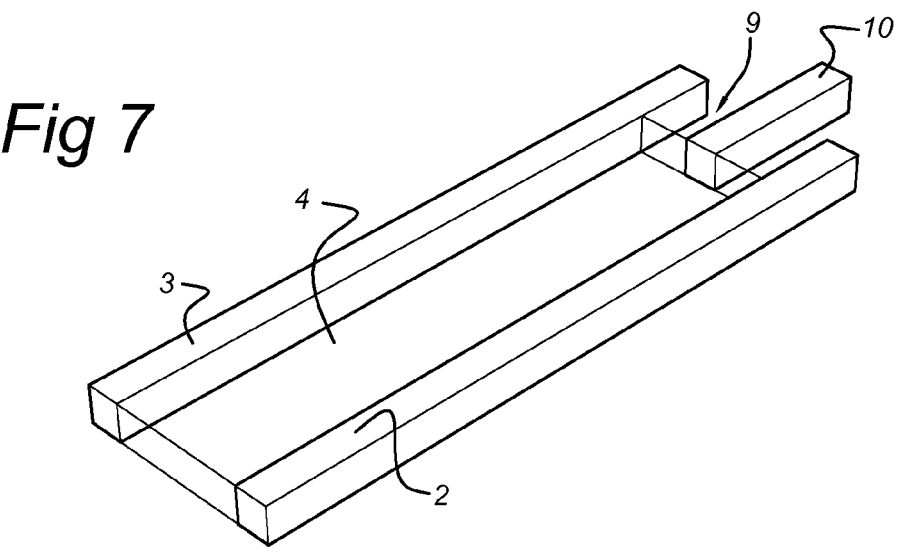
FIG. 7 shows an alternative embodiment of a termination of a waveguide structure.

In a second type of termination element, which is shown schematically in FIG. 7, the equivalent of an electromagnetic waveguide with an open termination is shown. In this embodiment, the isolating material structure 4 is terminated by another material, creating an edge 9 (or border) of the isolating material structure 4. To enhance its characteristics, in the embodiment shown a further metal strip like structure 10 is added positioned in the middle between the metal structures 2, 3 and adjoining the edge 9 of the isolating material structure 4.

In both embodiments shown in FIGS. 6 and 7 a simple multiscattering plasmonic structure 1 is provided using the termination elements 8.

Figure 8:
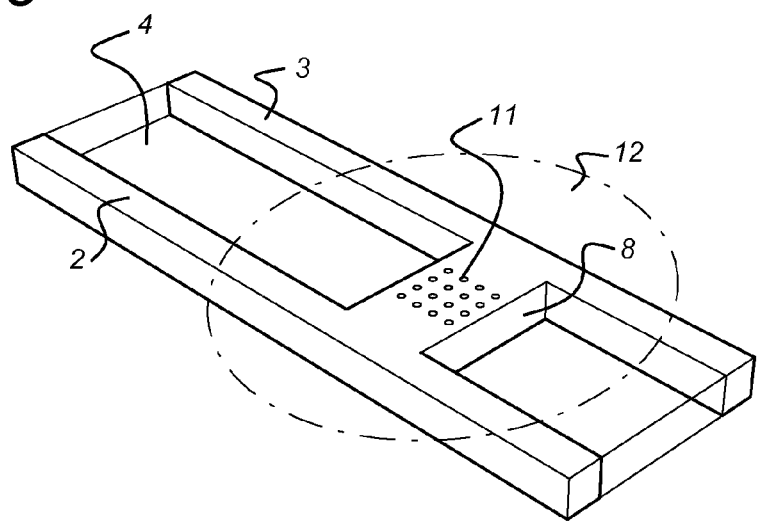
FIG. 8 shows a perspective view of an output coupling embodiment of a waveguide structure.

In a further embodiment, one of the metal structures, e.g. the termination element 8, is provided with a plurality of quantum dots 11, as shown in the embodiment shown schematically in the perspective view of FIG. 8. Quantum dots 11 as such are known in the field of surface plasmon polaritons, and in the present invention embodiments, these quantum dots 11 may be used to transform a surface plasmon polariton into photons, or to transform photons into a plasmon surface polariton In a further embodiment group, the waveguide structure 1 provided with the structures to transform surface plasmon polaritons into photons (i.e. a transformation element comprising e.g. a termination element 8 and the plurality of quantum dots 11), can be augmented with the provision of a further transformation element, which transforms the photons into electrical signals. Electrical interfaces will also be possible through the use of integrated single-photon detectors that will generate conventional logic CMOS output signals. These interfaces will be designed for multi-gigabit-per-second speeds.

In an embodiment, a photon detector 12 is provided overlying the transformation element for conversion into an electrical signal. The photon detector 12 may be selected from the group comprising a SPAD, PiN, PN, APD, MSM. Such photon detectors 12 may be easily integrated in the waveguide structure 1 using known CMOS processing techniques. Any one of the proposed photon detectors 12 may be used without limitation.

Figure 9:
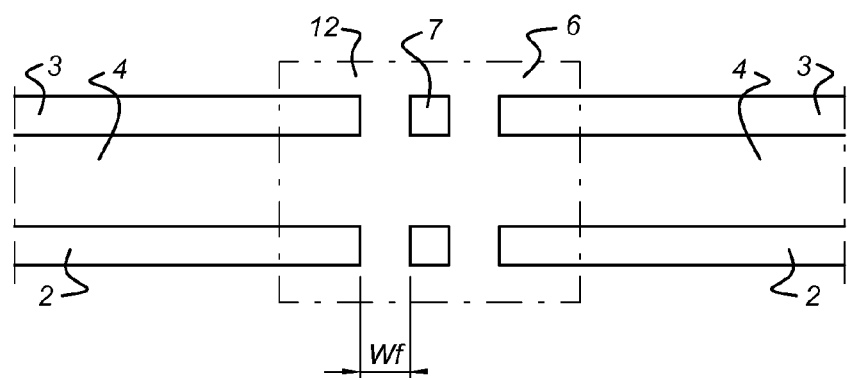
FIG. 9 shows a top view of an embodiment using a combination of waveguide structures implementing a filter.

In an even further embodiment, a crystal like structure 6 is used as part of a single waveguide structure 1, as shown in the top view of an embodiment of a waveguide structure as shown in FIG. 9. Alternatively, this embodiment can be considered as two waveguide structures 1 connected to each other using a photonic crystal like structure 6. In these embodiments, the crystal like structure 6 comprised interruptions in both metal strip like structures 2, 3, which result in one or more metal pins 7 isolated from each other. The interruption between the structures 2, 3 and the pins 7 has a dimension indicated as $w_f$.

Depending on the dimensions of pins 7 (or better, the distance between the pins 7 and metal structures 2, 3, indicated by $w_f$ in FIG. 9), such a complex waveguide structure 1 may act as a filter. When combined with other elements, such as the transformation element 8, 11 and/or photon detector 12, plasmonic devices may be designed with specific characteristics.

While the invention has been illustrated and described in detail in the drawings and foregoing description, such illustration and description are to be considered illustrative or exemplary and not restrictive; the invention is not limited to the disclosed embodiments.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. Any reference signs in the claims should not be construed as limiting the scope.

The invention claimed is:

1. A waveguide structure for propagating a surface plasmon polariton, comprising:
a plasmonic waveguide having two strip like structures of a first material positioned parallel to each other and a further strip like structure of a second material positioned between the two strip like structures of the first material, the first and second material being different materials selected from the group of a metal material and an isolating material, the two strip like structures of the first material being positioned at a fixed distance from each other,
wherein the two strip like features of the first material and the further strip like structure of the second material of the plasmonic waveguide are present in a single layer of a CMOS processed substrate, wherein the first and second material of the waveguide structure comprises CMOS compatible materials in the form of deposited patterned layers and/or modified patterned layers of the substrate,
wherein the two strip like features of the first material are part of a single deposited patterned layer and/or modified patterned layer, and
a further plasmonic waveguide, the further plasmonic waveguide being oriented plan parallel to the single layer or perpendicular to the single layer.

2. The waveguide structure of claim 1, wherein the fixed distance has a value within the range from 50-450 nm.

3. The waveguide structure of claim 1, wherein a width of the two strip like structures of the first material is between 80 and 300 nm, e.g. 120 nm.

4. The waveguide structure of claim 1, wherein the thickness of the two strip like structures of the first material is in the order of magnitude of a single layer of metallization as applied in CMOS processing.

5. The waveguide structure of claim 1, wherein the waveguide structure comprises two plasmonic waveguides which extend in two different directions in the single layer, and at least one sectional plasmonic waveguide connecting the two plasmonic waveguides.

6. The waveguide structure of claim 1, wherein the waveguide structure comprises a crystal-like part, the crystal-like part comprising one or more interruptions in one or both of the two strip like structures of the first material.

7. The waveguide structure of claim 6, wherein the waveguide structure comprises three plasmonic waveguides connected to each other by the crystal-like part.

8. The waveguide structure of claim 1, wherein the waveguide structure comprises a termination element.

9. The waveguide structure of claim 8, wherein the termination element comprises a scattering structure.

10. The waveguide structure of claim 8, wherein the first material is a metal, and the termination element is a metal structure short-circuiting the two metal strip-like structures.

11. The waveguide structure of claim 8, wherein the second material is an isolating material, and the termination element is formed by a border of the isolating material between the two metal strip-like structures.

12. The waveguide structure of claim 8, wherein a photon detector is provided overlying the termination element for conversion into an electrical signal.

13. A plasmonic integrated circuit comprising one or more waveguide structures according to claim 1.

14. A method for providing a waveguide structure for propagating a surface plasmon polariton, the method comprising:
providing a plasmonic waveguide by processing a single layer of a substrate using complementary metal oxide semiconductor processing techniques, the plasmonic waveguide having two strip like structures of a first material positioned parallel to each other and a further strip like structure of a second material positioned between the two strip like structures of the first material, the first and second material being different materials selected from the group of a metal material and an isolating material, the two strip like structures of the first material being positioned at a fixed distance from each other, wherein the two strip like features of the first material and the further strip like structure of the second material of the plasmonic waveguide are provided in a single layer of a CMOS processed substrate, wherein the first and second material of the waveguide structure comprise CMOS compatible materials in the form of deposited patterned layers and/or modified patterned layers of the substrate, wherein the two strip like features of the first material are part of a single deposited patterned layer and/or modified patterned layer, and wherein a further plasmonic waveguide is provided, the further plasmonic waveguide being oriented plan parallel to the single layer or perpendicular to the single layer.

15. The method of claim 14, wherein the thickness of the two strip like structures of the first material is in the order of magnitude of a single layer of metallization as applied in CMOS processing.

16. The method of claim 14, wherein the waveguide structure comprises two plasmonic waveguides which extend in two different directions in the single layer, and at least one sectional plasmonic waveguide connecting the two plasmonic waveguides.

17. The method of claim 14, wherein the waveguide structure comprises a crystal-like part, the crystal-like part comprising one or more interruptions in one or both of the two strip like structures of the first material.

18. The method of claim 14, wherein the waveguide structure comprises three plasmonic waveguides connected to each other by the crystal-like part.

19. The method of claim 14, wherein the waveguide structure comprises a termination element.

20. The method of claim 19, wherein the termination element comprises a scattering structure.

21. The method of claim 19, wherein the first material is a metal, and the termination element is a metal structure short-circuiting the two metal strip-like structures.

22. The method of claim 19, wherein the second material is an isolating material, and the termination element is formed by a border of the isolating material between the two metal strip-like structures.

23. The method of claim 19, wherein a photon detector is provided overlying the termination element for conversion into an electrical signal.

24. A waveguide structure for propagating a surface plasmon polariton, comprising:
   a plasmonic waveguide having two strip like structures of a first material positioned parallel to each other and a further strip like structure of a second material positioned between the two strip like structures of the first material, the first and second material being different materials selected from the group of a metal material and an isolating material, the two strip like structures of the first material being positioned at a fixed distance from each other,
   wherein the two strip like features of the first material and the further strip like structure of the second material of the plasmonic waveguide are present in a single layer of a CMOS processed substrate, wherein the first and second material of the waveguide structure comprises CMOS compatible materials in the form of deposited patterned layers and/or modified patterned layers of the substrate,
   wherein the two strip like features of the first material are part of a single deposited patterned layer and/or modified patterned layer, and
   wherein the waveguide structure comprises two plasmonic waveguides which extend in two different directions in the single layer, and
   at least one sectional plasmonic waveguide connecting the two plasmonic waveguides.

* * * * *